Nov. 10, 1964 R. RISLER Re. 25,678

TAKE-APART DOLL WITH DETACHABLE GARMENTS

Original Filed Nov. 24, 1958 3 Sheets-Sheet 1

INVENTOR
ROBERT RISLER
BY Irwin S. Thompson
ATTY.

TAKE-APART DOLL WITH DETACHABLE GARMENTS

Original Filed Nov. 24, 1958 3 Sheets-Sheet 2

INVENTOR
ROBERT RISLER
By Irwin S. Thompson
ATTY.

TAKE-APART DOLL WITH DETACHABLE GARMENTS

Original Filed Nov. 24, 1958 3 Sheets-Sheet 3

INVENTOR
ROBERT RISLER
BY Irvin S. Thompson
ATTY.

United States Patent Office

Re. 25,678
Reissued Nov. 10, 1964

25,678

TAKE-APART DOLL WITH DETACHABLE GARMENTS

Robert Risler, Paris, France, assignor to Cragstan Corporation, New York, N.Y., a corporation of New York Original No. 2,964,873, dated Dec. 20, 1960, Ser. No. 776,050, Nov. 24, 1958. Application for reissue Dec. 17, 1962, Ser. No. 245,642
Claims priority, application France, Dec. 26, 1957, 754,630
3 Claims. (Cl. 46—22)

Matter enclosed in heavy brackets [ ] appears in the original patent but forms no part of this reissue specification; matter printed in italics indicates the additions made by reissue.

The present invention has for its object a doll which is of simple design, inexpensive to produce and adaptable to a variety of costumes which are easily obtained. This doll may either serve as a toy or it may be used for decorative effects or for publicity purposes.

This doll is characterised in that the body is formed by separate members which are assembled together in such manner as to fix between them the pieces of cut-out fabric paper, or other material which forms the dress.

With this method of assembly, the doll's dress is not made of parts which are sewn and fitted on the doll in the manner of ordinary clothes; instead of this, it is made of portions which are simply cut-out, without seams, which are simply held by the assembly of the parts constituting the body of the doll.

This form of clothing avoids the need to make-up conventional dresses for the doll and can be produced at low cost. A great variety of dolls can thus be very cheaply produced and can especially be used as a publicity support for clothing materials.

The complete dress outfit for the doll may be provided in a single short length of printed fabric, which is ready for cutting into sections to be inserted between the body parts of the doll.

According to one form of construction, the body of the doll is constituted by a central member provided with slots forming pincer jaws, in which the other parts are engaged. The sections of the dress are fixed at the junction of the various parts with the jaws or, if so desired between each other.

The accompanying drawings show one form of construction of the doll according to the present invention.

Figure 1:
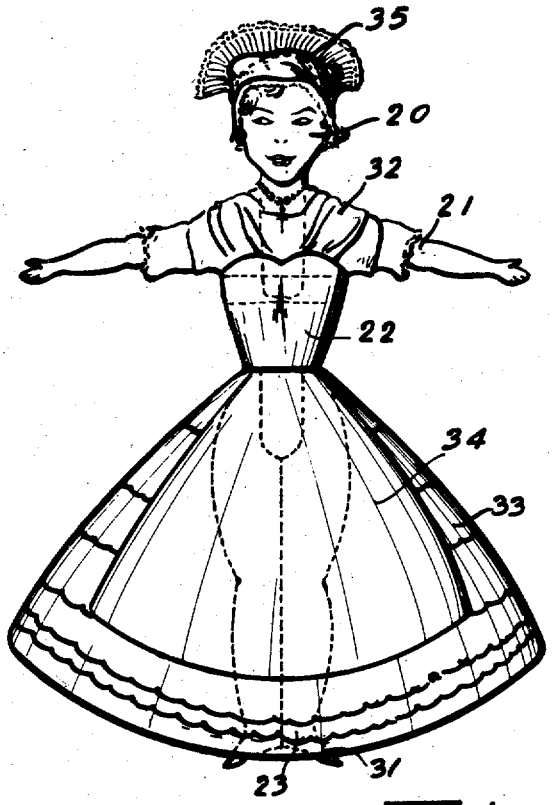
FIG. 1 is a general view of the front of the doll when assembled and dressed.

The doll is made-up of *anatomical portions including* a head 20, arms 21, a *three-dimensional* central part 22 representing the trunk and a bottom section 23 corresponding to the abdominal and leg portions. All these parts are quite separate and detachable. They are associated with each other by means of the central member 22.

The said central member has an upper portion 24 comprising a slot or groove 25 and a lower portion 26 with a slot 27.

Figure 5:
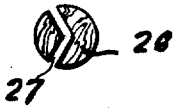
FIG. 5 is a view in cross-section, taken along the line V—V of FIG. 4.
Figure 6:
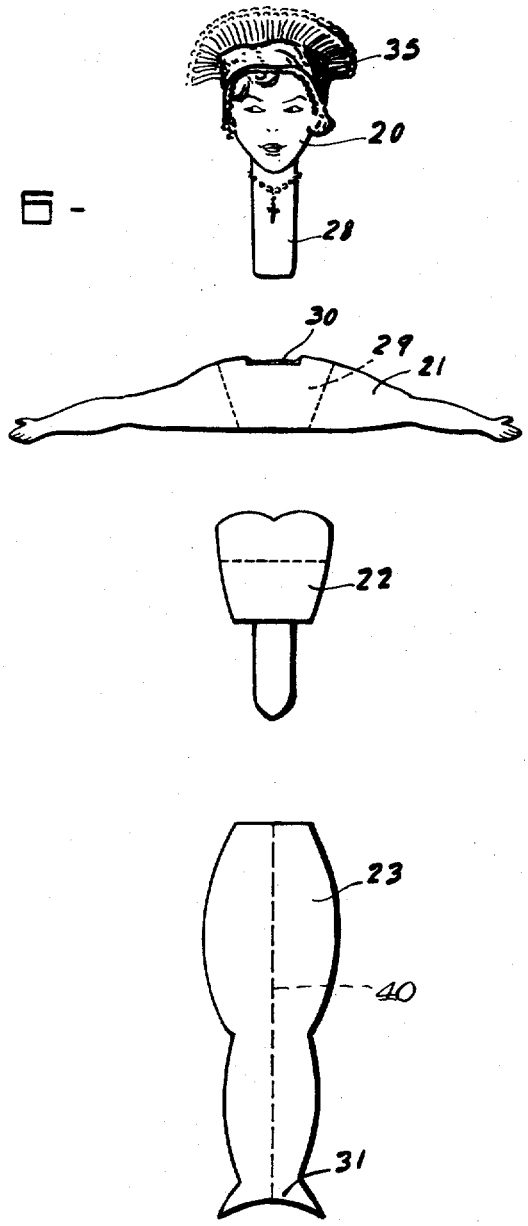
FIG. 6 is a detail view of the parts which constitute the body of the doll when dismantled.

The upper portion 24 has the shape of the body above the waist, and may be decorated, if required, with a bodice or a bolero. The lower portion 26 is narrower. The slot 25 of the upper portion is formed in a straight line; it penetrates to a depth corresponding to only a part of the height of the portion 24. The slot 27 of the lower portion 26 penetrates to a depth which substantially corresponds to the entire height of the said lower portion 26; this slot should preferably be in the form of a chevron or V, as shown in FIG. 5.

The member 22 can be made of any material such as wood, plastic material, ebonite, metal, etc. It will be seen that on account of its two slots 25 and 27, this member forms two jaws or pincers which serve to assemble the other parts of the body 20, 21 and 23. These parts are made of any flat material, cardboard or the like, and may for example be cut-out from a printed board. The head 20 is provided with an end-piece 28. The arms 21 are formed by a member having a folded-back portion 29 and slots 30. After folding the portion 29, the end-piece 28 of the head 20 is inserted in the slot 30 and the whole is inserted in the slot 25 so as to form the upper half of the doll's body.

Figure 2:
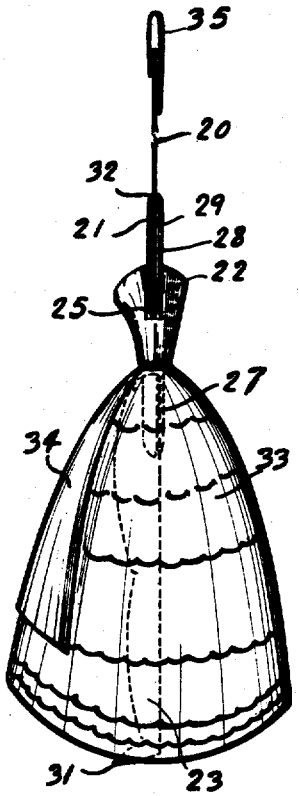
FIG. 2 is a profile view corresponding to FIG. 1.
Figure 3:
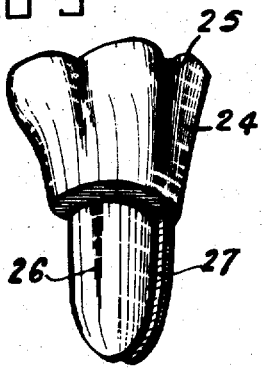
FIG. 3 shows the central member in perspective.
Figure 4:
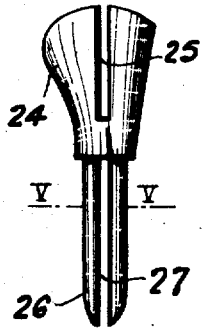
FIG. 4 is a profile view of this member.

The lower half of the body is formed by the cut-out member 23 which is preferably shaped to have a widened-out portion 31 at its base to represent the feet. This member is folded lengthwise along the line 40 so that it can be inserted in the V-shaped slot 27 of the member 22. This method of assembly is illustrated in FIGS. 1 and 2. It ensures that the doll stands firmly on its widened base 31.

Figure 7:
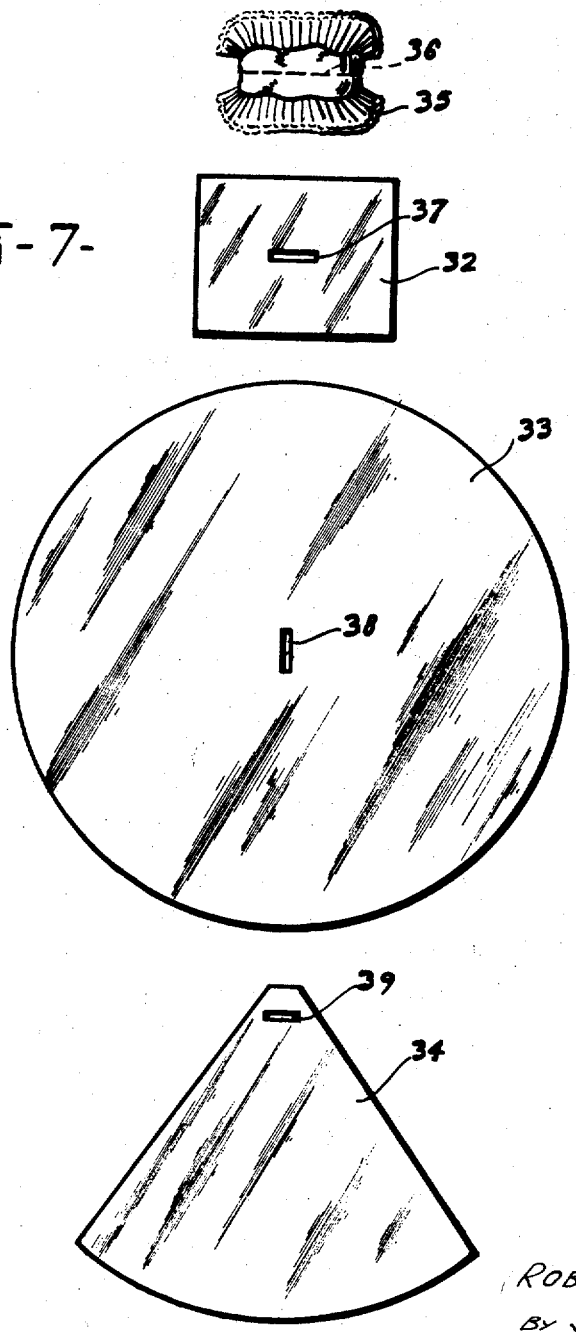
FIG. 7 shows the parts of the dress in detail.

While this assembly is being effected however, the dressing of the doll is carried out at the same time by inserting articles of dress between the assembled parts. These articles, which are made of paper, fabric, or even plastic material, and are preferably cut-out without seams or any assembly, consist for example, as shown in FIG. 7, of a rectangular portion 32 taking the shape of the body, a circular or oval portion 33 representing the skirt, and a cut-out portion 34 in the form of an apron. There may be provided in addition the cut-out portion 35 which is folded at 36 to form the head-dress.

The bodice portion 32 is provided with a slot 37 which is engaged in the end-piece 28 of the head. This portion 32 is then folded over the lower edge of the part 21 and is engaged together with this latter in the slot 25.

The skirt portion 33 is provided at its centre with a slot 38. The apron portion 34 is provided in like manner with a slot 39. These slots are of the same size as the lower part 26 of the central member 22.

The parts 33 and 34 are mounted on this part 26 before the base 23 is fixed in the slot 27. By this means they are clamped between the part 24 and the base 23.

It will be seen that the doll formed in this way lends itself to many different forms of presentation, in the way of styles and colours of dresses. These dresses can be made from simple cut-out pieces which are very easy to make.

What I claim is:

1. A transformable doll constituted by a body formed by members which are assembled to each other, with interchangeable clothing elements, comprising an element having the shape of a bust and provided with upper and lower slits, an element forming the arms, and an element forming the head, these two latter elements being inserted in detachable manner in the upper slit of the bust element, an element forming the legs and inserted in the lower slit of the bust element, the parts of clothing: skirt, blouse, kerchief and apron, constituted by pieces of cut-out fabric without seams comprising an opening which is slightly larger than the section of the portions of the elements which engage in the slits of the bust element, the said parts of clothing being placed and held in position by inserting the corresponding element in the slit of the bust element.

*2 A doll comprising a first part having a portion shaped to represent a trunk in three dimensions, said first part having a transverse slot extending across the upper portion thereof, a second part of flat material having a front portion shaped to represent arms, a centrally disposed folded back portion and a slot between said folded back portion and said front portion, a third part of flat material shaped to represent a head and having a depending end-piece, an apertured garment part to cover at least partially said second part, said end-piece extending through said garment part and said slot in said second part and between the front and rear portions thereof, said second and third parts together with said garment part being received in said transverse slot in the upper portion of said first part.*

*3. The doll recited in claim 2 including a fourth part shaped from flat material to represent legs, a slotted portion of reduced diameter depending from said first part, and a generally circular, seamless skirt portion having a central aperture formed therein, said slotted portion extending through said skirt aperture and receiving said*

*fourth part to detachably connect said first part with said fourth part and said skirt part.*

References Cited by the Examiner

The following reference, cited by the Examiner, are of record in the patented file of this patent or the original patent.

UNITED STATES PATENTS

| | | | |
|---|---|---|---|
| 543,767 | 7/95 | Gibson | 46—157 |
| 1,330,043 | 2/20 | Offutt | 46—157 |
| 1,436,671 | 11/22 | Newton | 46—157 |
| 2,079,550 | 5/37 | Mott | 46—157 |
| 2,467,139 | 4/49 | Links et al. | 46—157 XR |
| 2,642,697 | 6/53 | Haskell | 46—157 XR |

FOREIGN PATENTS

| | | |
|---|---|---|
| 5,568 | 1915 | Great Britain. |
| 925,761 | 3/47 | France. |
| 1,164,132 | 5/58 | France. |

DELBERT B. LOWE, *Primary Examiner.*